US011693622B1

(12) United States Patent
Elders et al.

(10) Patent No.: US 11,693,622 B1
(45) Date of Patent: Jul. 4, 2023

(54) CONTEXT CONFIGURABLE KEYWORDS

(71) Applicant: Amazon Technologies, Inc., Seattle, WA (US)

(72) Inventors: Mark Douglas Elders, Seattle, WA (US); Nathan Lee Bosen, Kirkland, WA (US); Richard Dault, Seattle, WA (US); Srikanth Doss Kadarundalagi Raghuram Doss, Seattle, WA (US); Skeets Jonathan Norquist, Duvall, WA (US); Ryan Christopher Rapp, Seattle, WA (US); Stanislava R. Vlasseva, Seattle, WA (US); Jeffery David Wells, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 109 days.

(21) Appl. No.: 17/210,689

(22) Filed: Mar. 24, 2021

Related U.S. Application Data

(63) Continuation of application No. 14/867,317, filed on Sep. 28, 2015, now abandoned.

(51) Int. Cl.
*G06F 3/16* (2006.01)
*G10L 15/04* (2013.01)
*G10L 15/22* (2006.01)
*G10L 15/18* (2013.01)

(52) U.S. Cl.
CPC ............. *G06F 3/167* (2013.01); *G10L 15/04* (2013.01); *G10L 15/1815* (2013.01); *G10L 15/22* (2013.01); *G10L 2015/223* (2013.01)

(58) Field of Classification Search
CPC .............. G10L 15/22; G10L 2015/088; G10L 2015/223; G10L 15/26
See application file for complete search history.

(56) References Cited

U.S. PATENT DOCUMENTS

| | | | | |
|---|---|---|---|---|
| 7,437,294 | B1* | 10/2008 | Thenthiruperai | 704/270.1 |
| 10,748,529 | B1* | 8/2020 | Milden | G06F 3/167 |
| 2007/0265847 | A1* | 11/2007 | Ross | G10L 15/1822 |
| | | | | 704/E15.044 |
| 2013/0073293 | A1* | 3/2013 | Jang | G10L 15/22 |
| | | | | 704/E21.001 |
| 2016/0071516 | A1* | 3/2016 | Lee | G10L 15/30 |
| | | | | 704/251 |
| 2016/0098990 | A1* | 4/2016 | Berke | G10L 15/18 |
| | | | | 704/275 |
| 2016/0225370 | A1* | 8/2016 | Kannan | G06F 3/167 |
| 2016/0260436 | A1* | 9/2016 | Lemay | G06F 3/167 |
| 2016/0357362 | A1* | 12/2016 | Gauci | G06N 5/04 |

* cited by examiner

*Primary Examiner* — Mark Villena
(74) *Attorney, Agent, or Firm* — Pierce Atwood LLP

(57) ABSTRACT

A system incorporating configurable keywords. The system can detect a keyword in audio data and execute one function for the keyword if a first application is operating, but a second function for the keyword if a second function is operating. Each keyword may be associated with multiple different functions. If a keyword is recognized during keyword detection, a function associated with that keyword is determined based on another application running on the system. Thus detection of a same keyword may result in a different function based on system context.

20 Claims, 12 Drawing Sheets

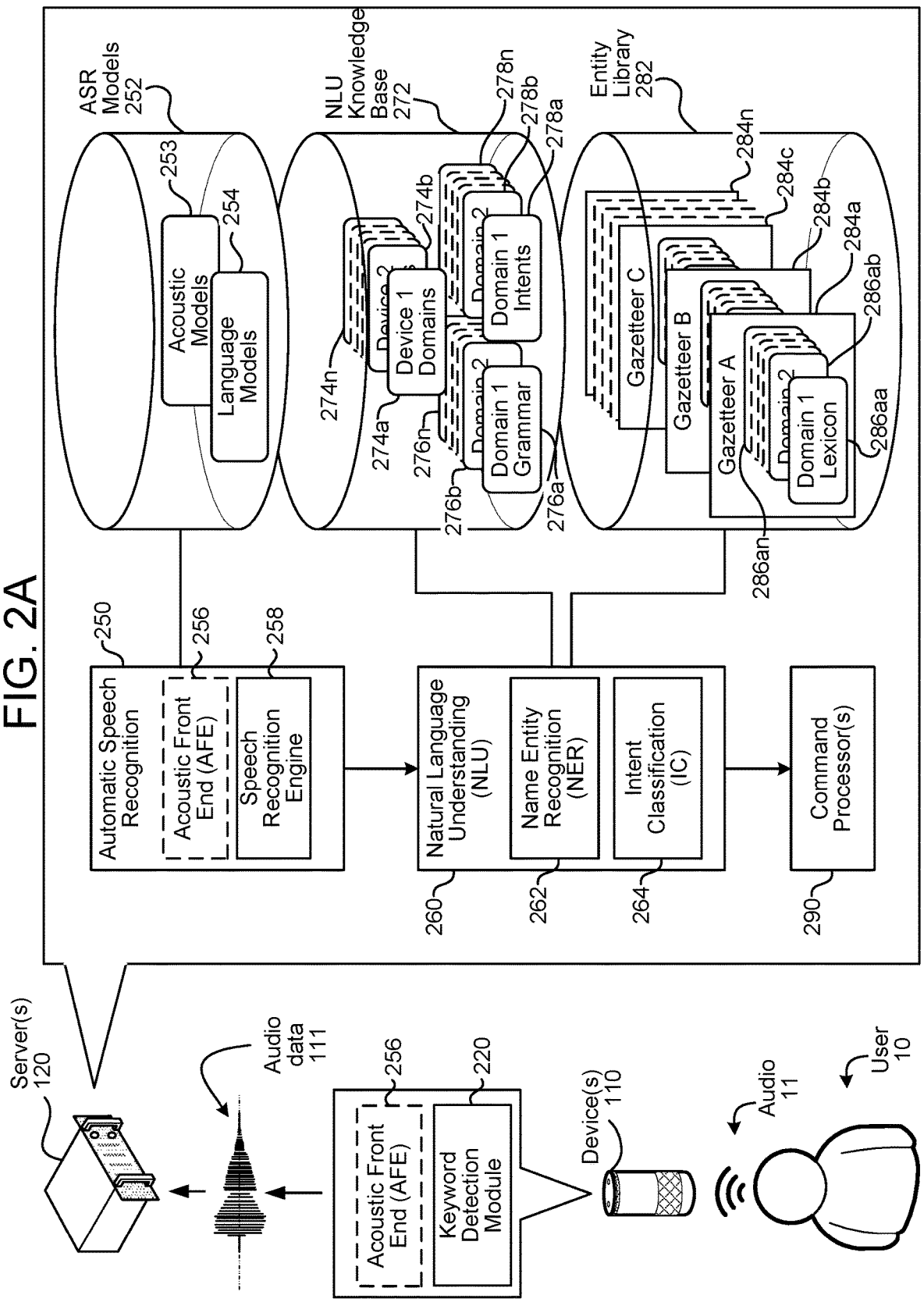

FIG. 3

Keywords

| Application | "Forward" | "Back" | "Skip" |
|---|---|---|---|
| Music Player | Skip forward 30 seconds in currently playing song; continue playback | Skip back 30 seconds in currently playing song; continue playback | Advance to next song in playlist; continue playback |
| Audible Ereader | Skip forward 1 page equivalent in currently playing item; continue playback | Skip backward 1 page equivalent in currently playing item; continue playback | Advance to next chapter; continue playback |
| Phone | Skip forward 30 seconds in currently playing voicemail; continue playback | Skip back 30 seconds in currently playing voicemail; continue playback | Navigate to next voicemail; begin playback |
| Email | Prepare new email forwarding current email; place cursor in "to" field | Navigate to previous email; activate speech processing function; await further instructions | Navigate to next email; activate speech processing function; await further instructions |
| Web Browser | Navigate to next active link in browser | Navigate to previously viewed page | Navigate to last active link on currently viewed page |

CONTEXT CONFIGURABLE KEYWORDS

CROSS REFERENCE TO RELATED APPLICATION

This application is a continuation of and claims priority to U.S. Non-Provisional patent application Ser. No. 14/867,317, titled "CONTEXT CONFIGURABLE KEYWARDS," filed on Sep. 28, 2015, the contents of which are expressly incorporated herein in its entirety.

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2A is a conceptual diagram of speech processing may be performed by the system following keyword detection.

FIG. 3 illustrates different functions that may be performed in response to detection of different keywords during operation of different applications.

DETAILED DESCRIPTION

Figure 1:
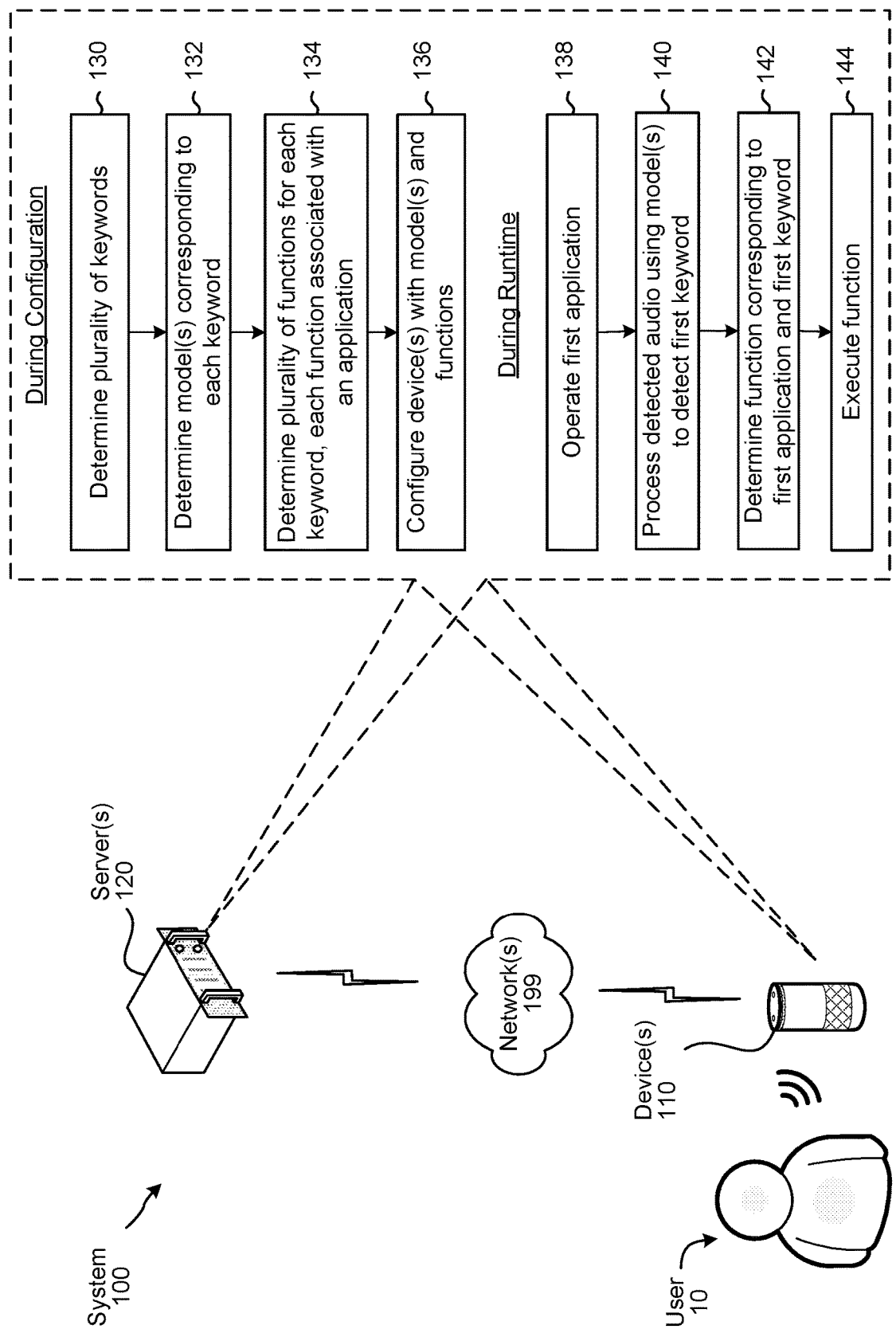
FIG. 1 illustrates a system for configurable keyword recognition according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve an audio receiving device, local to a user, having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected audio to the remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would send audio data corresponding to that subsequent audio to a remote device (or maintain it locally) to perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

One drawback to such systems is that the time from reception of a spoken command to the time of eventual execution may be longer than desired due to audio data needing to travel to a remote server, the remote server needing to process the audio data, and resulting command instructions/results needing to travel from the remote server to the local device for execution/playback/display. Such latency concerns may be less important with commands that are less time sensitive (for example, an information query such as "Alexa, in what state is the Grand Canyon located?") and more of a concern with commands that are time sensitive (for example, a command to be executed quickly "Alexa, answer the phone.").

One solution to this latency problem is to configure a device to recognize keywords using techniques that bypass traditional speech processing (such as ASR and NLU). A keyword is a particular word, phrase, expression, or other sound that a system is configured to detect specifically (as contrasted with general speech recognition). As keyword detection (also generally known as keyword spotting) typically takes place on a local device that may not have the computing power of a large speech processing server, current devices typically limit the number of keywords a device is configured to recognize. Once the device recognizes a keyword, the device may then execute a particular function associated with the keyword.

A wakeword is an example of a specialized keyword. For a wakeword, the associated function is typically to "wake" a local device so that it may capture audio following (or surrounding) the wakeword and send audio data to a remote server for speech processing. For speech processing enabled systems, the wakeword may be the only keyword recognized by the system and all other words are processed using typical speech processing. In systems where other keywords may be enabled, each respective keyword may only be associated with a single same function that is executed regardless of the operating context of the device. For example, saying "Alexa" (a wakeword) may activate speech processing components regardless of whatever else the system is doing. In another example "shutdown" may be a configured keyword to shut off the system, also regardless of whatever else the system is doing.

To reduce the latency of handling certain speech commands, while also improving the flexibility to handle certain spoken words differently depending on their context, offered is a system for configurable keywords that are capable of quick recognition by a system, but also can execute different functions depending on the operating context of the system.

As shown in FIG. 1, a system 100 may be configured to recognize a plurality of keywords and to execute different functions corresponding to those keywords depending on the operating context of the system. As shown in FIG. 1, a system 100 may include one or more devices 110 local to user 10, as well as one or more networks 199 and one or more servers 120 connected to device 110 across network(s) 199. The server(s) 120 may be capable of performing traditional speech processing (such as ASR and NLU) as described herein. A single server may be capable of performing all speech processing or multiple server(s) 120 may combine to perform the speech processing. Further, the server(s) 120 may be configured to execute certain commands, such as commands spoken by user 10. In addition, certain speech detection or command execution functions may be performed by device 110. In particular, the device 110 may be configured to recognize keywords spoken by the user 10. The one or more servers 120 may also be configured to train machine learning models or other models that may be sent to a device 110 so that the device 110 may perform certain operations using the models, such as keyword spotting.

As shown in FIG. 1, the system may operate in two stages, a configuration stage and a runtime stage. The configuration stage may include when a device is manufactured, when new keywords are configured for the system 100, when new functions are added to existing keywords, or at other times. The runtime stage may include when audio is captured by the system and processed to detect certain configured keywords. As shown, the steps may be executed by some combination of system components including device(s) 110 and server(s) 120. During configuration the system may determine (130) a plurality of keywords. The system may also determine (132) one or more models corresponding to each keyword. The models may be representations of audio signatures of each keyword or other data that the system may use in keyword spotting. The system may also determine (134) a plurality of functions for each keyword, where each function is associated with an application. While certain keywords may only have one function, the present system is directed to at least a group of keywords (such as the plurality) having different functions associated with those keywords.

The different keyword functions may be associated with different applications operable by the system. The applications are different software, operating system, or other operations that the system may be operating at a time a keyword is detected. For example, as explained below a certain keyword may have one function associated with a music application, a different function associated with an audio reader application, a different function associated with a telephone application, etc. The system 100 may then configure (136) the device(s) 110 with the model(s) and functions for the plurality of keywords.

During runtime the system may operate (138) a first application. The first application may be running on some combination of device(s) 110 and server(s) 120. For example, a music application may obtain music from a server 120 and play the music through device 110. Or a telephone application may route a call through a server 120 but capture and output audio for the call through device 110. The server 120 may also activate and/or operate the first application remotely from the device 110. Other different configurations/examples are also possible. The system 100 (for example through device 110) may detect audio and process (140) the detected audio using the model(s) to detect a first keyword represented in the detected audio. The system 100 may then determine (142) a function associated with the operating first application and the first keyword. The system may then execute (144) that function. At a later point during runtime the system may operate a second, different, application but detect the same keyword. The system may then determine a second, different, function associated with the same keyword but the different second operating application. The system may then execute a different function even though the same keyword was detected. Thus the system may implement and execute configurable keywords.

Further details of the configuration of keyword configuration and detection are explained below, following a discussion of the overall speech processing system of FIG. 2A. The configurable keywords as described in reference to FIG. 1 may be operated by a system that incorporates various speech processing components as described in FIG. 2A. FIG. 2A is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2A may occur directly or across a network 199. An audio capture component, such as a microphone of device 110, captures audio 11 corresponding to a spoken utterance. The device 110, using a keyword detection module 220 (further described below), then processes the audio, or audio data corresponding to the audio, to determine if a keyword (such as a wakeword) is detected in the audio. If a keyword other than a wakeword is detected, a function may be executed corresponding to the keyword and an operating application of the system, as described below. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

An ASR process 250 converts the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMIs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results. The NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As can be appreciated from the above, a number of different processing steps may be involved when performing traditional speech processing (e.g., ASR and/or NLU) to convert spoken audio into an executable function. Such traditional speech processing steps may include linguistic, textual and semantic analysis of incoming audio as well as other techniques to interpret an utterance included in the audio, and to send a command related to that interpreted utterance to a command processor 290 for processing. Further, in the case of a distributed speech processing system, where audio is captured by a local device, ASR and NLU are performed by a remote device, and the command is executed by some combination of the local device and remote device, latency may result in an undesirable user experience because the system takes too long from receipt of the utterance command and eventual execution of the command. As noted above, configurable keywords provide a shortcut to executing specific configured functions quickly, for example by a local device 110, without necessarily engaging in full ASR, NLU, or other traditional speech processing.

Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword. Then, a system may execute a function associated with a detected keyword. One benefit to keyword detection is that it typically can be performed much faster than ASR and/or NLU processing. One drawback, however, of keyword detection is that it typically is not as robust as traditional speech processing in terms of determining precise spoken words or determining user intent. Further, traditional keyword detection systems typically assign a single function to each keyword (that is, have a one-to-one keyword to function relationship), thus reducing the flexibility and utility of keyword detection. These are certain reasons why many systems that have full speech processing capability may only employ keyword detection for wakeword detection, leaving other speech related processing to ASR, NLU or similar components.

As a way of taking advantage of keyword detection's benefits, while reducing its drawbacks, offered is a configurable keyword system, where certain keywords may be associated with multiple different functions, each function executable in different contexts, for example, when different applications are operating by a system.

Figure 2B:
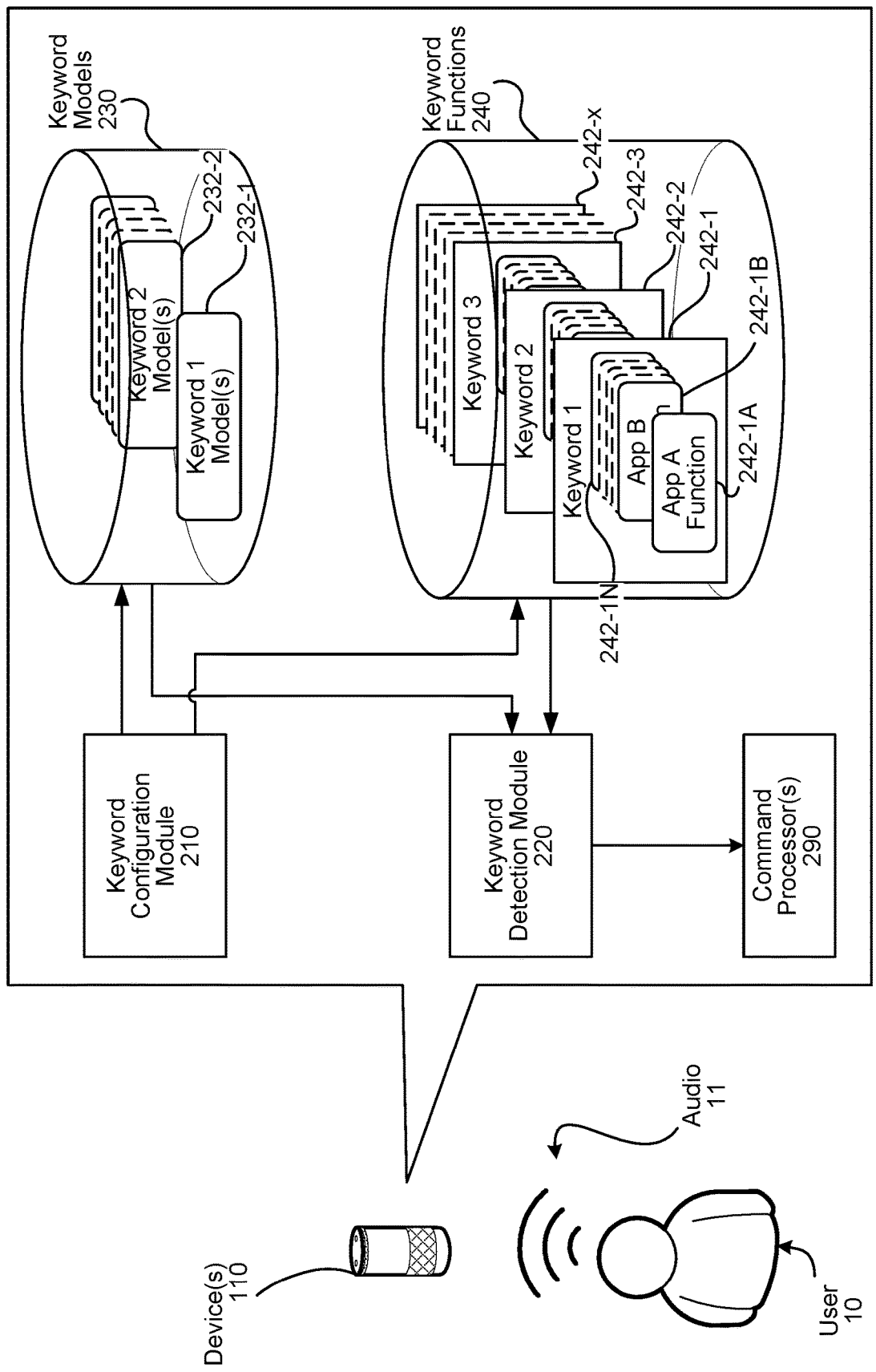
FIG. 2B is a conceptual diagram of components for keyword configuration and detection according to embodiments of the present disclosure.

As illustrated in FIG. 2B, a device 110 may include a number of components for keyword configuration, keyword detection, and keyword function execution. Although the components are illustrated as part of device 110, they may also be included in other devices, such as server 120 or spread across multiple devices 110 and/or servers 120. For example, a server 120 may include the keyword detection module 220 and command processor 290 whereas the local device 110 may include the keyword detection module 220 (such as in a situation where the local device 110) is primarily used for inputting and outputting audio but the server 120 handles more complex tasks).

The keyword detection module 220 works in conjunction with other components of the device, for example a microphone (not pictured) to detect keywords in audio 11. For example, the device 110 may convert audio 11 into audio data, and process the audio data with the keyword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the keyword detection module 220 to perform keyword detection to determine when a user intends to speak a command to the device 110. The keyword detection module 220 may compare audio data to stored models or data associated with a keyword(s) to detect a keyword. One approach for keyword detection applies general large vocabulary continuous speech recognition (LVCSR) systems to decode the audio signals, with keyword searching conducted in the resulting lattices or confusion networks. LVCSR decoding may require relatively high computational resources. Another approach for keyword spotting builds hidden Markov models (HMM) for each keyword and non-keyword speech signals respectively. The non-keyword speech includes other spoken words, background noise etc. There can be one or more HMMs built to model the non-keyword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the keyword spotting system may be built on deep neural network (DNN)/recursive neural network (RNN) structures directly, without HMM involved. Such a system may estimate the posteriors of keywords with context information, either by stacking frames within a context window for DNN, or using RNN. Following-on posterior threshold tuning or smoothing is applied for decision making. Other techniques for keyword detection, such as those known in the art, may also be used.

A keyword configuration module 210 may configure the system 100 to recognize a keyword. The keyword configuration module 210 may import models or data into keyword model storage 230. Each keyword may be associated with a plurality of models to allow the system to recognize the keyword in a number of different situations (loud, noisy, etc.) and will a number of different speakers. Thus the keyword model storage 230 may include models for each keyword the system is configured to recognize, such as keyword 1 model(s) 232-1, keyword 2 model(s) 232-2, etc.

In this respect, the system may be pre-programmed with a limited number of keyword spotting models/audio signatures corresponding to the sounds of the respective keywords. The models may include audio signatures corresponding to the specific keywords of the system. The keywords may be preconfigured (for example, set by a manufacturer of a device) or may be selected by a user, application, or application developer. The models to recognize the keywords may also include pattern recognition type models to assist in determining when a portion of audio data matches one or more of the models. The models correspond to specific sounds so that a device may perform limited recognition of the keyword without necessarily having the capabilities of a more robust ASR system including acoustic models, language models, etc. The device simply matches incoming audio to the models and if a match is detected, the user device determines what keyword corresponds to the matched model and then determines and/or executes what function is associated with the keyword and the context of the system (for example, what application is running on a device). Such limited keyword spotting is more limited than full ASR, but also requires fewer computing resources. Further, such a keyword spotting system may operate under conditions where full speech processing may not be available, for example when a local device 110 is capable of keyword detection (and resulting function execution) but is unable to connect with a server 120 that performs ASR/NLU, like when a network connection becomes unavailable.

Figure 2C:
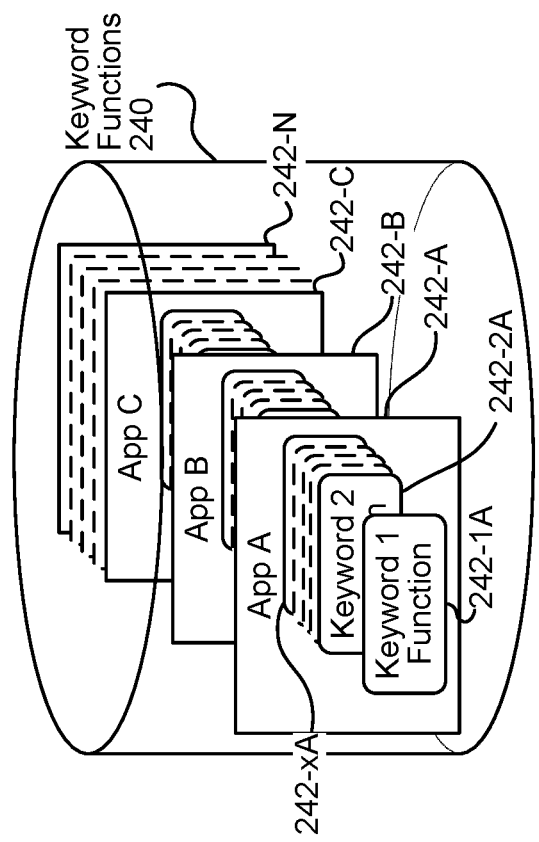
FIG. 2C is a conceptual diagram illustrating a component for storing keyword functions according to embodiments of the present disclosure.

The keyword configuration module 210 may also configure each keyword with a plurality of functions, where each particular function is associated with a particular context of a device, such as an application that may be operating when the keyword is detected. The keyword configuration module 210 may associate each keyword with its related functions and store that association in keyword function storage 240. This association may take place remotely, at a server 120 associating keywords to functions. The associations may be stored in different ways. As shown in FIG. 2B, data may be stored associating each keyword with the different functions for each potential application. Thus, as illustrated, a data structure for Keyword 1 242-1 may include functions for application (App) A (242-1A), a function for App B (242-1B), and so on for each application until application N (242-1N). Similar data structures may exist for each Keyword including Keyword 2 (242-2), Keyword 3 (242-3) all the way to Keyword X (242-x). In another example, keyword-function relationships may be organized according to applications, thus allowing the system to call up different keyword-function relationships when a certain application is running, thus potentially speeding up execution of a particular function when its associated keyword is recognized. For example, as shown in FIG. 2C, a data structure for App A (242-A) may include functions associated with Keyword 1 (242-1A), Keyword 2 (242-2A) through Keyword X (242-xA). Similar data structures may exist for each application, such as App B (242-B), App C (242-C), until application N (242-N). Other forms of organizing data linking keywords, functions and applications (and potentially models 232) may also be used.

As illustrated, each keyword may be associated with one or more models 232 such that the keyword detection module 220 may compare audio data to the model(s) 232 to detect a keyword. The model(s) 232 may be preconfigured (for example configured prior to delivering a device 110 to a user) or may be trained by the system after a device 110 has been used by a user. The model(s) may be customized, for example during a training session allowing a user to train the system 100 on how the user may speak a specific keyword. Thus a model may be associated with a particular user, user ID, user profile, etc.

During runtime, if a keyword is detected using the model(s) 232, the keyword detection module 220 may send an indication to the command processor 290 so the command processor may execute the appropriate function. The indication or message sent from the keyword detection module 220 may include an indication of the detected keyword itself or may include only an indication of the function to be performed. The command processor 290 (which may be local to device 110 or may be located on a remote server 120) may then execute the function. As can be appreciated, the command processor 290 that receives the indication may be different depending on the desired function. For example, if the keyword function relates to music playback, the keyword detection module 220 may send the indication to the command processor 290 associated with a music application or playback function (which may, for example, be located at server 120). In another example, if the keyword function relates to lighting controls, the keyword detection module 220 may send the indication to the command processor 290 associated with a lighting application or home control function (which may be located at device 110, server 120, or at another device, for example a controller within a home associated with device 110). Further, the indication may be sent to multiple command processors 290 depending on the function(s) associated with the keyword. Various different command processors 290 may be incorporated as part of the system 100.

FIG. 3 illustrates an example of different keywords "forward," "back," and "skip" that may have different functions associated with different applications. The applications illustrated are Music Player, Audible Ereader, Phone, Email and Web Browser. As shown, each keyword may be associated with a different function depending on what application is being operated by the system. For example, if the keyword "forward" is detected while the system is operating a music playing application, the system may skip forward 30 seconds in a currently playing song and may then continue playback from that point. In another example, if the same keyword "forward" is detected while the system is operating an email application, the system may create a new email forwarding a current email and place the cursor in the "to" field.

Many examples of such functions are envisioned as potentially part of the system 100. For example, a keyword "goodbye" may cause a first application to terminate, but may cause another application to access a command menu. A "pause" keyword may, for a first application, be associated with a function where the first application ceases operation (without shutting down) and await further commands, whereas the same "pause" keyword may, for a second application, be associated with a function where the second application ceases operation (without shutting down), starts a 15 second countdown timer, and upon reaching the end of the countdown timer, continues operation again. Again, many such examples are possible. Further, a specific keyword may be associated with multiple functions. For example, as shown in FIG. 3, the keyword "skip" when spoken during operation of a phone application may navigate to a next voicemail and begin playback. Further, a specific keyword (when detected by a keyword detection technique) may result in a function to activate traditional speech processing as described above with regard to FIG. 2A. For example, as shown in FIG. 3, the keyword "back" when spoken during operation of a phone application may navigate to a previous email, activate a speech processing function, and await further instructions (for example by awaiting further spoken instructions that will be received and sent to a remote server 120 for traditional ASR/NLU processing). Thus, keyword detection may precede ASR processing in a manner similar to traditional wakeword detection, but the configurable keyword may also involve additional functions above simply waking speech detection (and indeed the same keyword may have different functionality depending on what application is operating when the keyword is detected).

Figure 4A:
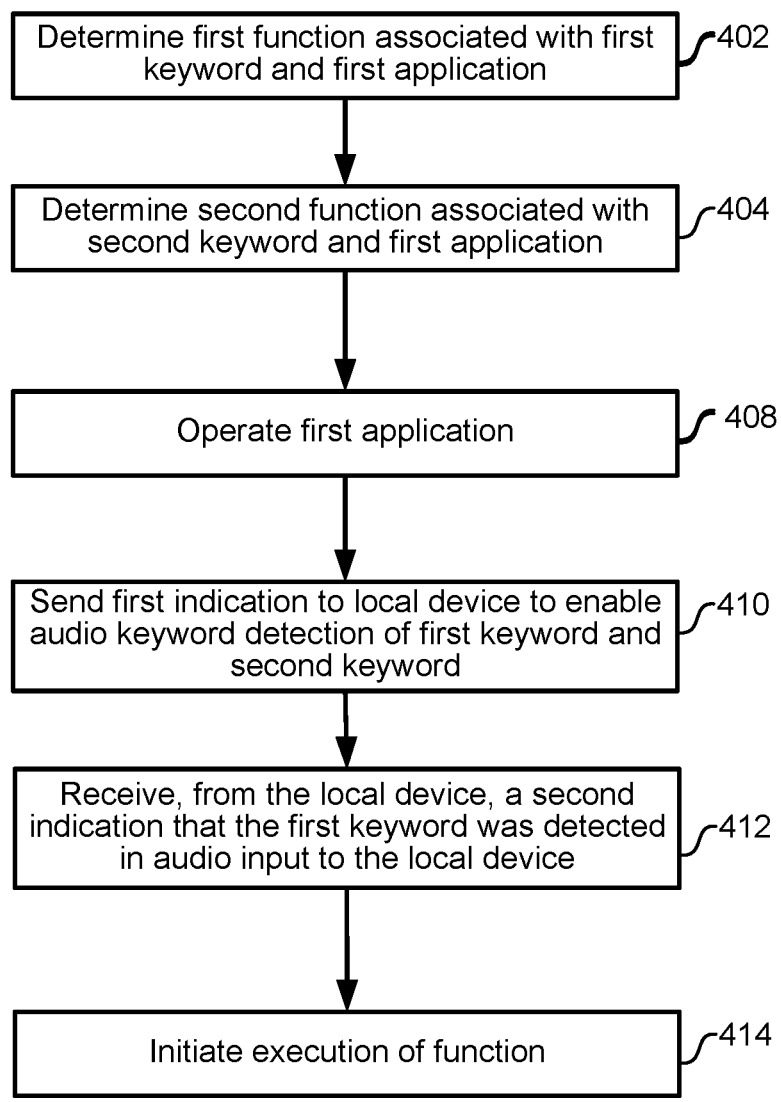
FIGS. 4A and 4B are flowcharts illustrating operation of a system using configurable keywords according to embodiments of the present disclosure.
Figure 4B:
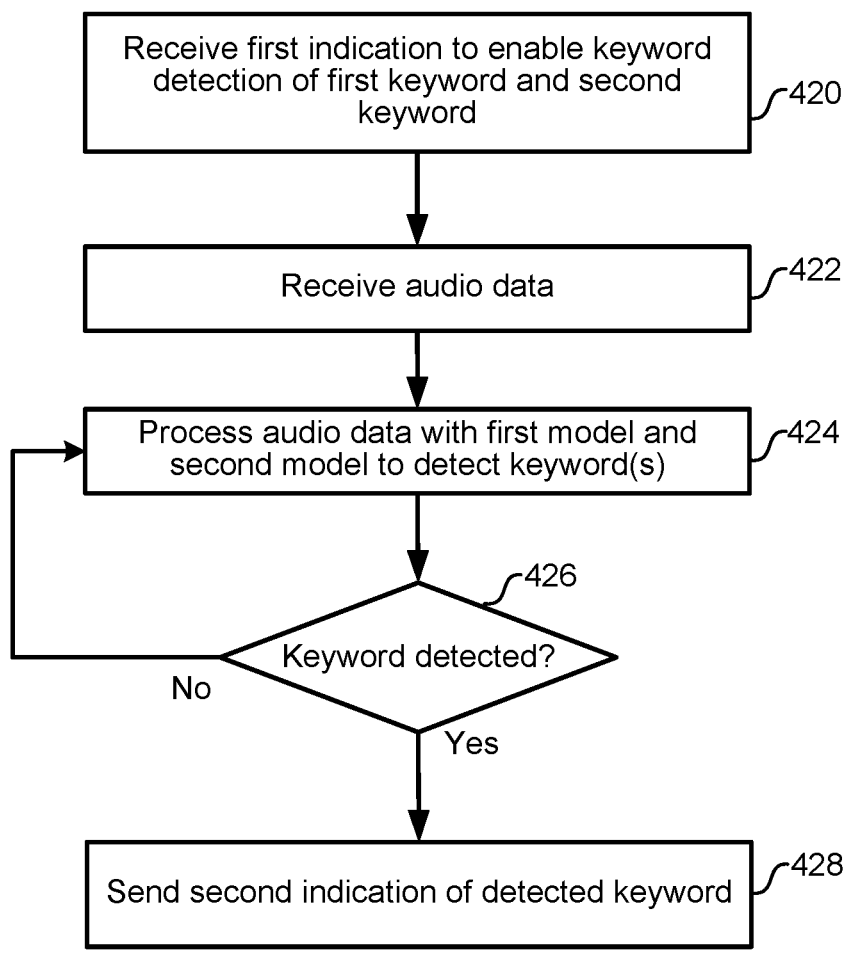

FIGS. 4A and 4B illustrate example flowcharts showing operation of the system 100 to process configurable keywords. The steps may all be executed by a local device 110, or may be split between a local device 110 and a remoter server 120. Further, while the steps are shown in a certain order, another order may be used. Further, certain illustrated steps may be omitted while others may be added. As shown, in FIG. 4A, the system 100, such as a server 120, may determine (402) a first function associated with a first keyword and first application as well as determine (404) a second function associated with a second keyword and the first application. The server 120 may determine to operate a first application. For example, the server 120 may receive audio data comprising speech, and may perform speech processing (e.g., ASR and/or NLU) to determine that the speech includes a command to operate a first application (for example, a music playing application). The server 120 may then activate or operate (408) the first application. The first application may be operated in conjunction with the local device 110 or be activated/operated remotely from the local device 110. The server 120 may send (410) a first indication to a local device 110 to enable (i.e., turn on) audio keyword detection, by the local device 110, of the first keyword and the second keyword, as those keywords have functions that are associated with the first application (other keywords may also be enabled depending on system configuration. The indication may be, for example, metadata identifying which keyword of a number of keywords the local device 110 should enable. For example, if the local device is configured to recognize 20 keywords, the indication may include metadata indicating that the local device 110 should enable keyword detection of keywords 3, 7, 12-15 and 19. The metadata/indication may be in various forms depending on system configuration. As part of operating the first application, the server 120 may generate first output data to be sent to the local device 110 where the local device 110 may output the first output data to the user in some form. For example, in the context of a music playing application that was initiated/operated by the server 120, the first output data may be streaming music data sent from the server 120 to the local device 110 for local playback. Other such examples are also possible. During operation of the first application, the server 120 may receive (412), from the local device 110, a second indication that the first keyword was detected in audio input to the local device. The server may determine that the first keyword is associated with the first function and the first application and may then initiate (414) execution of the function. Initiation of execution of the function may include sending a second remote device (such as a server associated with the application) an indication that the first keyword was detected by the local device 110. Initiation of execution of the function may also be followed by execution of the function, if the function is capable of being executed by server 120. Execution of the function may include generating additional output data, which may be sent to the local device 110. At some point in time the server 120 (or other device) may discontinue/deactivate operation of the first application. The server 120 (or other device) may then send a further indication to the local device 110 to disable (i.e., turn off) detection of the keyword(s) associated with the first application. Thus, if the server 120 discontinues operating a first application but initiates operation of a second application, the server 120 may send the local device 110 an indication to disable detection of keyword(s) associated with the first application and an indication (which may be the same indication or a different indication) to enable detection of keyword(s) associated with the second application.

FIG. 4B shows the operation of the system 100, from the example point of view of the local device 110. The local device 110 may receive (420) the first indication to enable keyword detection of the first keyword and second keyword. The local device may receive (422) audio data and may process (424) the audio data with a first model (associated with the first keyword) and a second model (associated with the second keyword). If a keyword is not detected (426:No) the device 110 may continue processing incoming audio data for a keyword. If a keyword is detected (426:Yes) the device 110 may send (428) a second indication of the detected keyword to the server 120. For example, if the first model (which may be an audio signature) matches the received audio with a sufficiently high confidence, the local device 110 may send the second indication to the server 120 indicating that the first keyword was detected.

Portions of the above process may repeat at a later time with a different application. For example, a server may later operate a second application, where the second application may be associated with different functions for the first and/or second keyword. Additionally, the second application may be associated with a third keyword. The local device 110 may be pre-configured to recognize the third keyword, or the server 120 may send the local device 110 a model/audio signature to use to recognize the third keyword. For example, as part of the indication to the local device 110 to enable recognition of the third keyword (or as part of a different communication), the server 120 may send the local device a .wav file, or other model/audio signature associated with the third keyword that the local device 110 may use to perform keyword detection of the third keyword.

In certain circumstances the system may confirm the existence of the keyword in audio received by the system. For example, if the first keyword is detected (426:Yes) by the local device 110, an indication of the first keyword may be sent (428) to a server 120. The local device 110 may also send the server 120 audio data corresponding to the first keyword (for example, audio data including the utterance of the keyword and a certain length of audio before and/or after the keyword). The server may then perform ASR and/or NLU processing on the audio data to confirm the presence of the keyword in the audio before the server initiates (414) the function (where the execution may be server-side alone or may be by and/or in conjunction with a local device 110 or another device, such as those illustrated in FIG. 8).

To process the steps of FIGS. 4A and 4B, in particular the receiving (422) of audio data, the system may be capable of processing incoming audio for keyword detection from various sources depending on where commands may come from. For example, the system 100 may be configured to capture audio using a microphone of a local device 110. The system 100, however, may also be configured to capture audio from other sources such as audio from a telephone connection (either wired or wireless) connected to device 110 where the audio may originate from a user local to device 110 or on an other end of the telephone line/connection. Similarly, the system may capture audio from other communication forms such as a video chat, in application chat (e.g., FaceTime, Skype, etc.), or other audio source. Thus, while the system may illustrate capturing audio from a microphone, other audio capture components may also be used.

As can be appreciated, a first keyword may be associated with a first function corresponding to a first application, but the same first keyword may be associated with a second function corresponding to a second application. Further, a second keyword may be associated with a third function corresponding to the first application, but the same second keyword may be associated with a fourth function corresponding to the second application. Or, the second keyword may be associated with the first function, only for the second application, depending on the system configuration.

A number of different techniques may be used to configure the system 100 (including device 110 and/or server 120) to recognize specific keywords, functions, and applications, and to operate using the configurable keywords described above. In one embodiment, a device 110 may be configured to recognize a set of keywords (for example keywords 1-12). The model(s) used to recognize each keyword may be incorporated into the device 110/system by a manufacturer, operating system developer, or similar original equipment manufacturer (OEM) or equivalent. As part of a software developer's kit (SDK) or other interface/tool, an application developer may configure software code that may be executed by the system 100/device 110 during operation linking each individual keyword with one or more functions to be executed when the particular application is in operation. The information sent from the application developer to the system may include data structures that may be incorporated into and used by the system to match keywords to specific functions for specific applications.

Figure 5A:
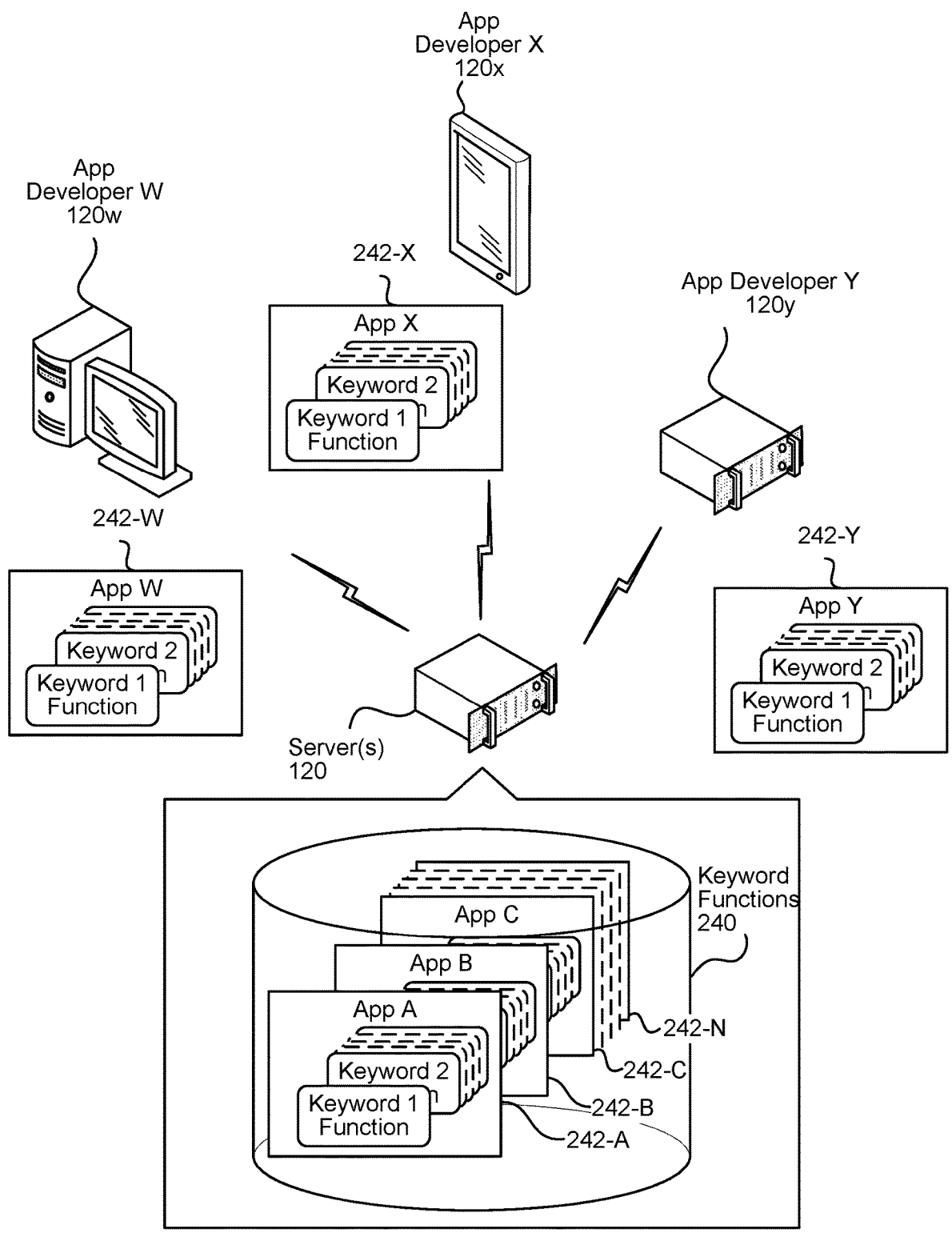
FIG. 5A illustrates configuring different keyword functions for different applications according to embodiments of the present disclosure.

For example, as illustrated in FIG. 5A, a server 120 that is part of the system 100 may include keyword function storage 240 which includes data corresponding to the functions associated for the keywords (for example, keywords 1-12) for each application of the system 100. Individual application developers, represented in FIG. 5A by devices 120w (for Application W), 120x (for Application X), and 120y (for Application Y) may send the system (through the server 120), data relating to the functions that should be executed for each keyword for the respective applications. For example, application developer 120w may send the server data 242-W indicating the functions associated with the keywords to be executed when a keyword is recognized during operation of Application W. Similarly, application developer 120x may send the server data 242-X indicating the functions associated with the keywords to be executed when a keyword is recognized during operation of Application X and application developer 120y may send the server data 242-Y indicating the functions associated with the keywords to be executed when a keyword is recognized during operation of Application Y. The specific form of the data 242-W, 242-X, and 242-Y (as well as the particular method of communication with the server 120) may be determined by the system configuration and/or software.

While certain applications may configure special functions for available keywords, not each keyword need be associated with a particular function for each application. For example, data 242-Y may indicate that keywords 4-7 perform no function when detected while Application Y is running. Further, certain default keyword functions may be configured by the system and may be available to specific applications if desired. Thus, for example, data 242-X may indicate that keywords 1-10 are associated with special functionality but that keywords 11-12 are associated with their respective default system configured functions. Other configurations are also possible.

After the system 100 incorporates the data relating to keyword functionality for each application, the system 100 may make that data available to individual device(s) 110. For example, if a user enables an application on a particular device 110, as part of enabling the application, the system 100 may populate the device 110 with the specific data needed for the keyword functionality. For example, if a user activates Application W on a device, the system 100 may also send the device data 242-W to be used by the device during runtime. In another embodiment, the server 120 may send portions of updated keyword function storage 240 (for example data 242-W, 242-X, and 242-Y) to individual devices 110 separate from an application installation process. The device's keyword configuration module 210 may incorporate 242-W into the device's specific keyword function storage 240 so that if a keyword is recognized while Application W is operating, the proper function may be executed.

Figure 5B:
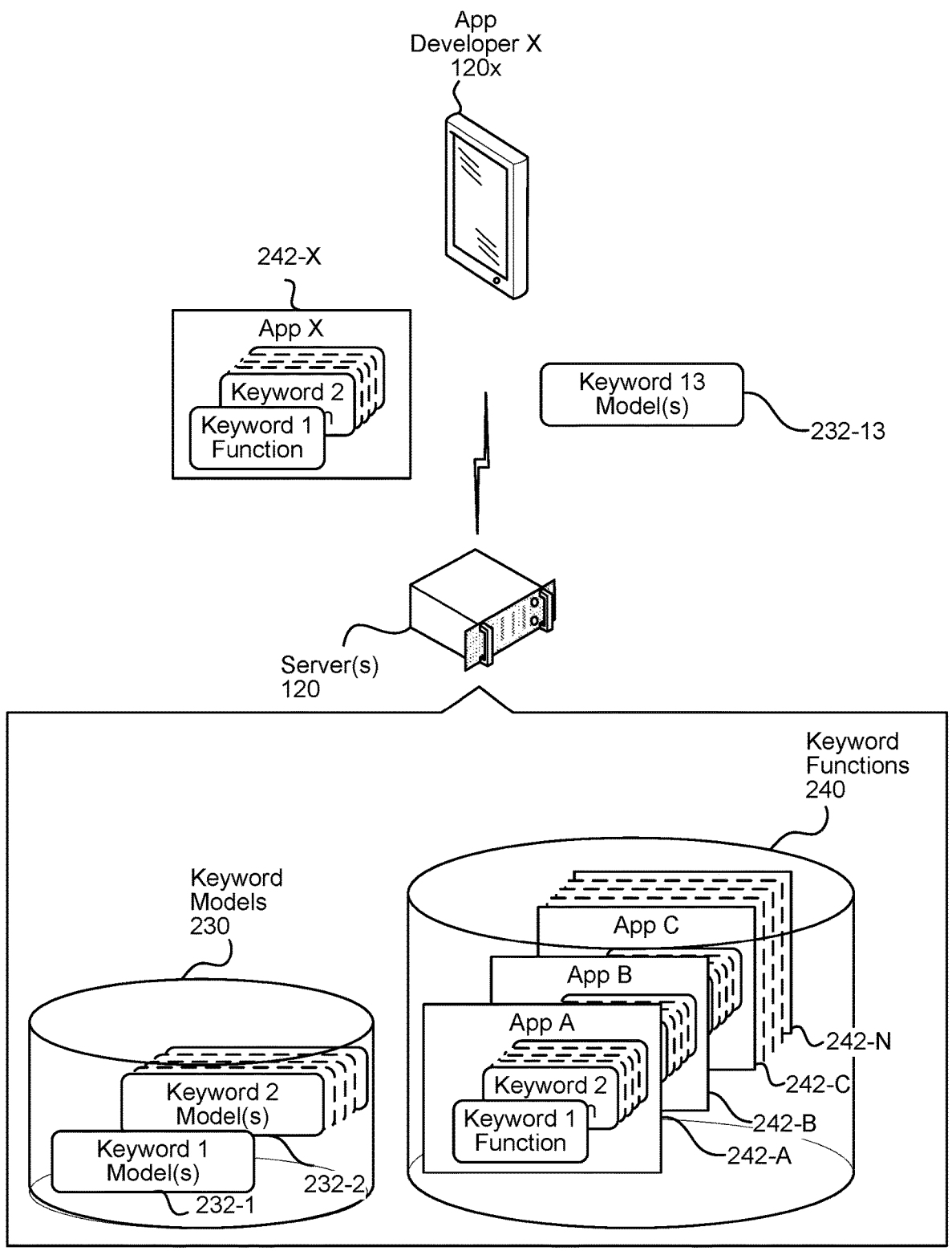
FIG. 5B illustrates configuring different keywords for different applications according to embodiments of the present disclosure.

In another embodiment, customized keywords may be created for particular applications. For example, as shown in FIG. 5B, application developer X 120x may desire a new keyword, keyword 13, be operable with Application X. The developer 120x may send the server 120 one or more models 232-13 that can be incorporated into keyword model storage 230 (on the server 120 and/or on device 110). The system may update a keyword configuration module 210 and/or keyword detection module 220 to be able to recognize the new keyword and to determine the appropriate functions associated therewith. New keywords may also be configured by users, for example during a user operable training process where the system 100 can guide the user operating the device 110 (and potentially in communication with server 120) on creating new keywords and associated model(s)/functions for execution during runtime.

Keyword functions associated with a particular application or application developer may include a call to a particular server or other device associated with the application. For example, in response to detection of a particular keyword, the local device and/or server 120 may send an indication to an application specific server that the particular keyword was detect, potentially along with an identification of which local device, user, etc. is associated with the particular detected keyword. The application server may then execute any additional functionality in response to the particular detected keyword.

Further, the user may be able to overwrite and/or customize specific functions for keywords based on user preferences. For example, an interface of the system 100 (operable either on device 110 or perhaps on a companion device) may allow the user to specify one or more functions for a particular keyword with a particular application, allowing more customizability to keyword-function pairs. Similarly, a user (or the system 100) may disable certain keywords or keyword-function pairs based on system operation (such as when a command processor 290 associated with a particular function becomes unavailable) or if a user wishes to deactivate a keyword under certain circumstances. User configured options may be associated with a user ID and/or a user profile and thus may be operated by multiple devices 110 depending on association between a particular device 110 and the user, user ID and/or user profile.

As a way of indicating to a user what keywords are operable, and what functions those keywords would execute, the device 110 may be configured with a visual indicator, such as an LED or similar component, that may change color depending on the currently active keyword-function pairings.

Figure 6:
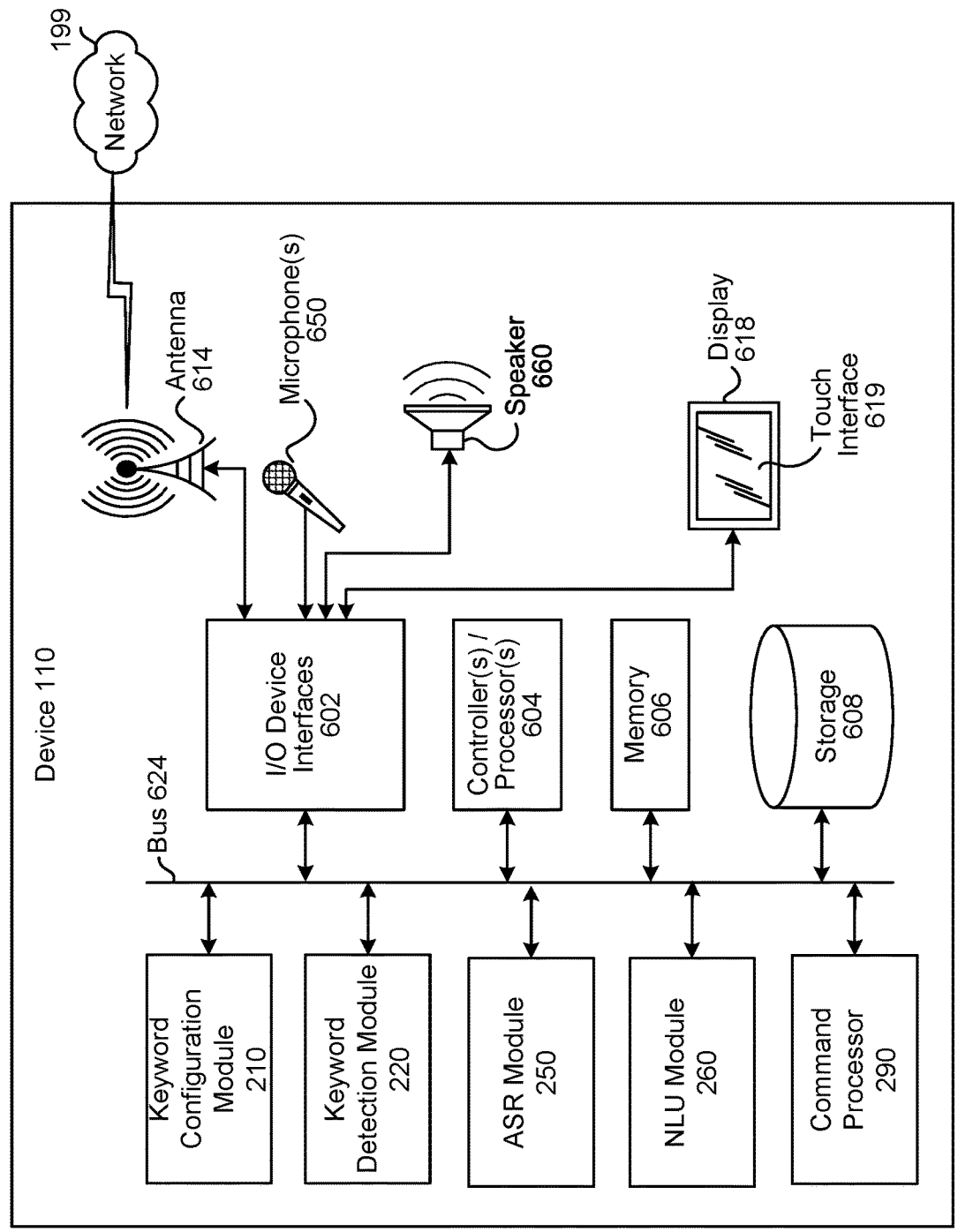
FIG. 6 is a block diagram conceptually illustrating example components of a device according to embodiments of the present disclosure.
Figure 7:
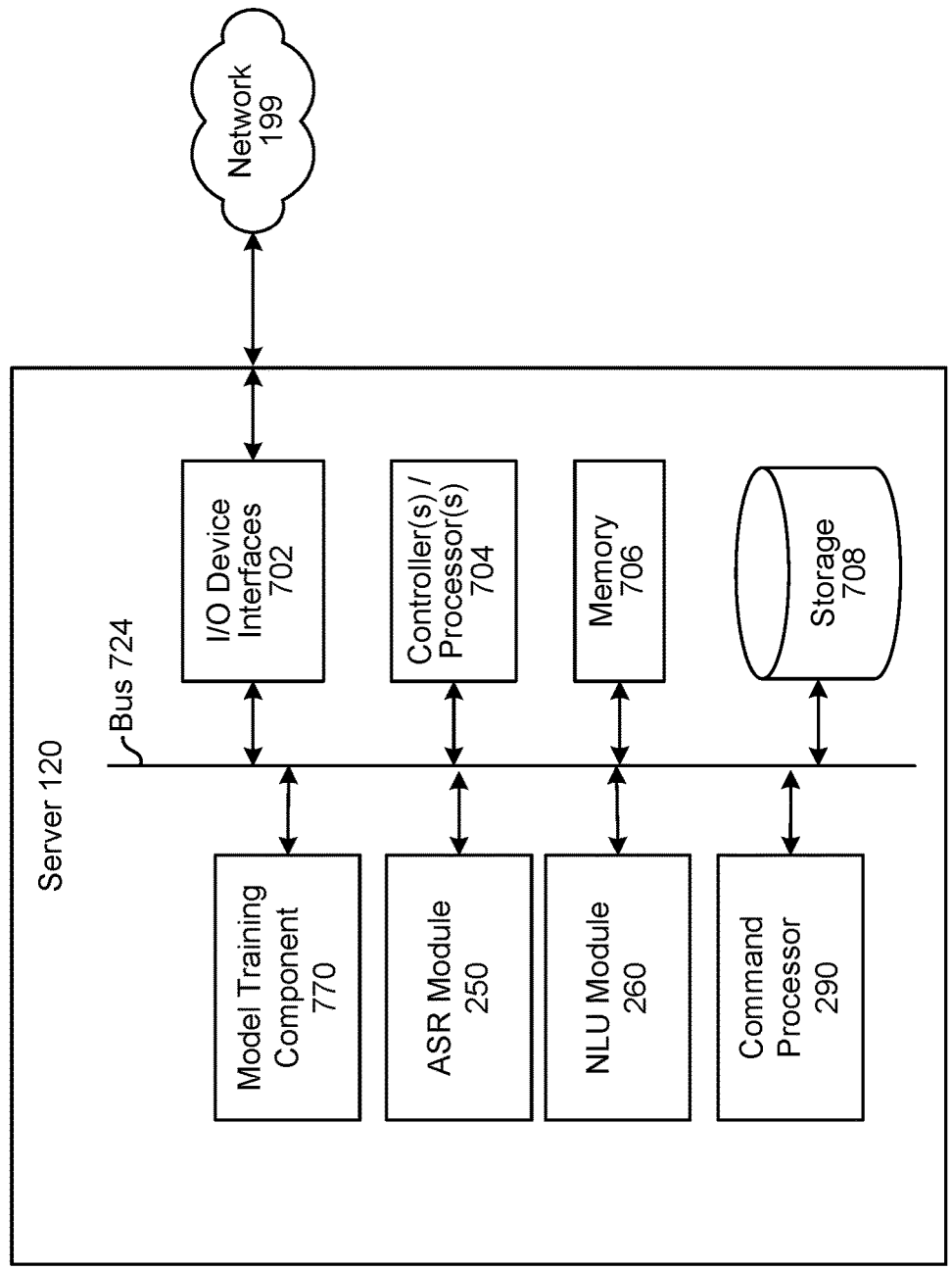
FIG. 7 is a block diagram conceptually illustrating example components of a server according to embodiments of the present disclosure.

FIG. 6 is a block diagram conceptually illustrating a local device 110 that may be used with the described system and may incorporate certain speech receiving/keyword spotting capabilities. FIG. 7 is a block diagram conceptually illustrating example components of a remote device, such as a remote server 120 that may assist with ASR, NLU processing, or command processing. Server 120 may also assist in determining similarity between ASR hypothesis results as described above. Multiple such servers 120 may be included in the system, such as one server 120 for ASR, one server 120 for NLU, etc. In operation, each of these devices may include computer-readable and computer-executable instructions that reside on the respective device (110/120), as will be discussed further below.

Each of these devices (110/120) may include one or more controllers/processors (604/704), that may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive (MRAM) and/or other types of memory. Each device may also include a data storage component (608/708), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces, as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to the device 110 of FIG. 6, the device 110 may include a display 618, which may comprise a touch interface 619. Or the device 110 may be "headless" and may primarily rely on spoken commands for input. The device 110 may include other indicators, such as an LED or similar indicator to indicate keyword configurations to a user. The device 110 may also include input/output device interfaces 602 that connect to a variety of components such as an audio output component such as a speaker 660, a wired headset or a wireless headset (not illustrated) or an audio capture component. The audio capture component may be, for example, a microphone 650 or array of microphones, a wired headset or a wireless headset (not illustrated), etc. If an array of microphones is included, approximate distance to a sound's point of origin may be performed acoustic localization based on time and amplitude differences between sounds captured by different microphones of the array. The microphone 650 may be configured to capture audio. The device 110 (using microphone 650, keyword detection module 220, ASR module 250, etc.) may be configured to determine audio data corresponding to detected audio data. The device 110 (using input/output device interfaces 602, antenna 614, etc.) may also be configured to transmit the audio data to server 120 for further processing or to process the data using internal components such as a keyword detection module 220.

For example, via the antenna(s), the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base 272 and/or entity library 282, or those storages may be separately located.

The device 110 and/or server 120 may also include a command processor 290 that is configured to execute commands/functions associated with a keyword and/or an ASR hypothesis as described above. One or more servers 120 may also include a training component 770 that is configured to determine a model(s) used to recognized keywords as described above, or to train other components (such as a keyword detection module 220) how to recognize keywords using the model(s).

The device 110 may include a keyword configuration module 210, which stores different keyword-function-application associations such as those discussed above.

The device 110 may include a keyword detection module 220, which may be a separate component or may be included in an ASR module 250. The keyword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The keyword detection module 220 receives captured audio and processes the audio (for example, using model(s) 232) to determine whether the audio corresponds to particular keywords recognizable by the device 110 and/or system 100. The storage 608 may store data (for example, keyword model storage 230 including speech models 232 relating to keywords, keyword function storage 240 including keyword data 242 and/or other data) relating to keywords and functions to enable the keyword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user.

The keyword detection module 220 may access the storage 608 and compare the captured audio to the stored models and audio sequences using audio comparison, pattern recognition, keyword spotting, audio signature, and/or other audio processing techniques.

To detect keywords in audio, the keyword detection module 220 may employ speech/audio comparison techniques. For example, the keyword detection module 220 may use audio or acoustic fingerprinting techniques to compare audio input to stored audio signatures and models from find a match. The keyword detection module 220 may also use phoneme or phrase recognition models and pattern recognition.

In general, one or more phrase model(s) or audio signature(s) may be created for each keyword. When identifying whether received audio data matches a configured keyword, acoustic models for the keyword may be compared to the audio data. In one aspect, the phrase models may be created based on phoneme models (or other subword units). In this aspect, a phoneme model is akin to an acoustic model. A Hidden Markov Model (HMM) may also be created for each keyword and/or audible command by concatenating the HMI states for the relevant phonemes together. In this aspect, the HMM for each keyword and/or audible command may be created based on the stored audio.

The device 110 and/or server 120 may include a training module (not shown) that may be used to train the locally stored speech models so the device 110 may be configured to recognize new keywords after being delivered to the user. The training module may be used to train the locally stored speech models during the configuration of the user device 110 to access the network based on the audio input of the user, as described in further detail below.

The keyword detection module 220 may employ classifier(s) or other machine learning trained models to determine whether the audio signal includes the keyword. The keyword detection module 220 may determine confidence levels or probabilities, indicating relative likelihoods that the wakeword has been detected in the corresponding audio signal(s). For example, a confidence level may be indicated as a percentage ranging from 0% to 100%. The keyword detection module 220 may operate in multiple stage, for example in a two-stage construction as described above, where a first stage involves a keyword hypothesis extractor and a second stage involves a classifier, such as a support vector machine (SVM) classifier.

If the device 110 determines that audio data includes a keyword, the keyword detection module 220 generates or provides an indication of detection of the keyword and/or the function associated with the keyword. The indication may be sent to a particular application (for example associated with command processor 290) that is operating, to the server 120, to another device, or to a different destination. The system may then execute a function associated with the keyword and the operating context of the system.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 6 and 7, are exemplary, and may be located a stand-alone device or may be included, in whole or in part, as a component of a larger device or system.

Figure 8:
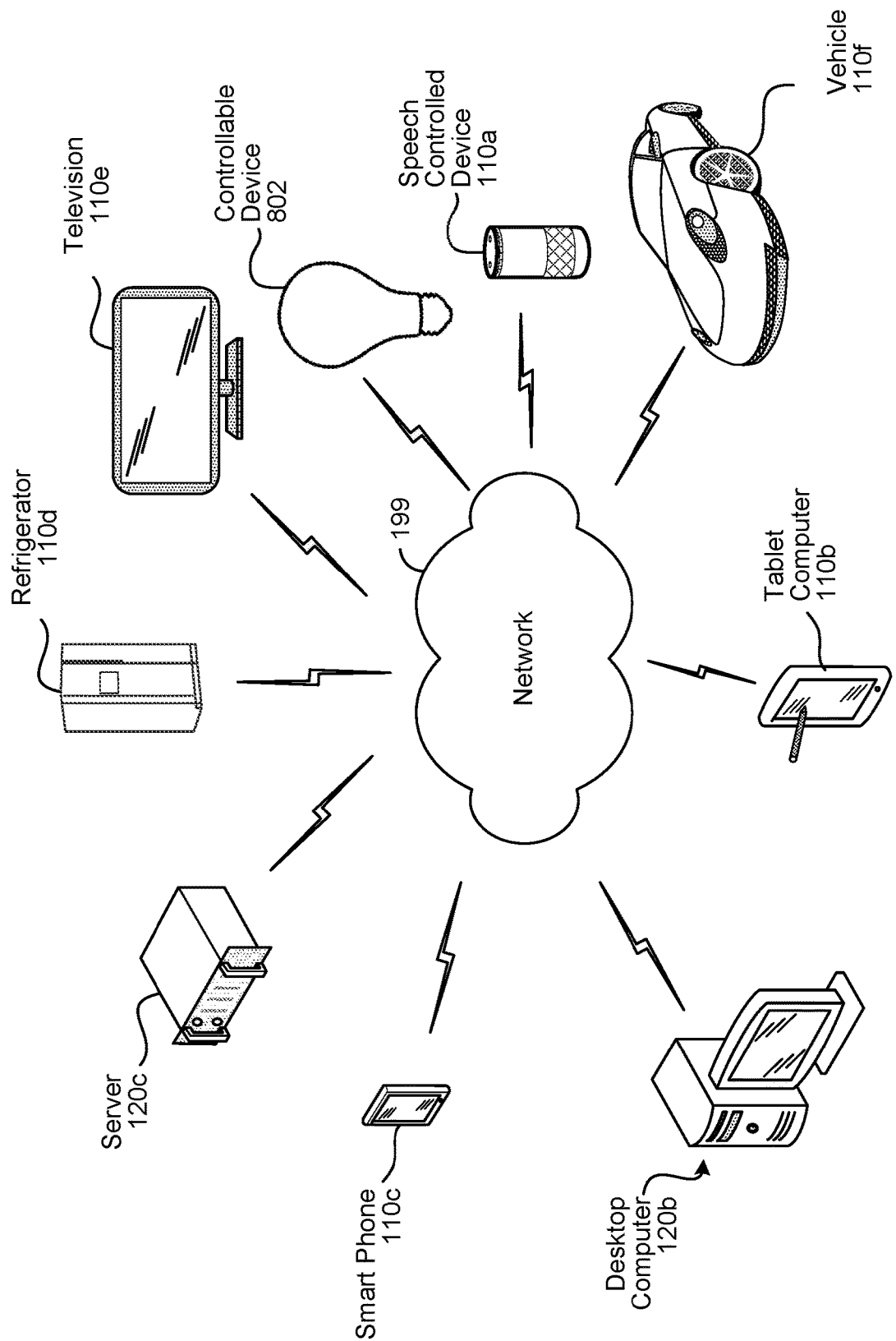
FIG. 8 illustrates an example of a computer network for use with the system.

As illustrated in FIG. 8, multiple devices (110a to 110c) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a television 110e, etc. may be connected to the network 199 through a wireless service provider, over a WiFi or cellular network connection or the like. Mobile local devices, such as a vehicle 110f may also be configured to capture audio as part of the system 100. The vehicle 110f may incorporate the configurable keyword functionality of local devices and may, like other local devices 110, communicate with server 120c, to receive indications of what keywords should be activated (or deactivated) for detection during certain applications. Other devices are included as network-connected support devices, such as desktop computer 120b, and a server 120c. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 250, NLU 260, etc. of one or more servers 120c.

Further, multiple devices 110 may be considered when operating the system. For example, if a speech controlled device 110a is operating at the same time as a tablet computer 110b, and the system 100 is capturing audio through speech controlled device 110a, but a first application is operating on tablet computer 110b, if a keyword is detected from audio captured by speech controlled device 110a, the function for the keyword may be determined based on the first application operating on tablet computer 110b. Thus, if a user is operating a tablet 110b and walking between rooms where each room has a speech controlled device 110a, if a keyword is detected by the system as the user travels between rooms, the function may be determined for the first application operating on the tablet 110b, as that function may be more likely to be the one intended by the user when speaking the keyword.

The system 100 may also include multiple controllable devices 802, illustrated by the lightbulb in FIG. 8. Such controllable devices may themselves not be configured for speech processing or audio capture, but may be controllable by the system in response to certain keywords. For example, for a lighting control application, a keyword such as "away" may result in a lighting system controlling bulbs such as 802 to a pre-set setting corresponding to a user being away from home. Many such controllable devices 802 may be included in the present system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computing system, comprising:
   at least one processor; and
   at least one memory comprising instructions that, when executed by the at least one processor, cause the computing system to:
   determine first configuration data associating a first model with a first function and a first contextual state, the first model being usable by a first device to determine that speech detected by the first device includes at least one first word;

send the first configuration data to the first device to configure the first device to cause the first function to be executed in response to the first model determining, while first device is in the first contextual state, that the at least one first word has been spoken;

determine second configuration data associating the first model with a second function different from the first function and a second contextual state different from the first contextual state; and send the second configuration data to the first device to configure the first device to cause the second function to be executed in response to the first model determining, while the first device is in the second contextual state, that the at least one first word has been spoken.

2. The computing system of claim 1, wherein the at least one memory further comprises instructions that, when executed by the at least one processor, further cause the computing system to:

receive, from the first device, audio data representing first speech;

process the audio data to determine that the first speech represents a request that a first application be executed; and based at least in part on determining that the first speech represents the request, send, to the first device, the first configuration data.

3. The computing system of claim 1, wherein the first model is configured to detect an audio signature of the at least one first word.

4. The computing system of claim 1, wherein the at least one memory further comprises instructions that, when executed by the at least one processor, further cause the computing system to:

configure the first model based at least in part on how a user of the first device speaks the at least one first word.

5. The computing system of claim 1, wherein the at least one memory further comprises instructions that, when executed by the at least one processor, further cause the computing system to:

receive, by the first device, a user input indicating the at least one first word is to be associated with a third function and a third contextual state; and store an association between the at least one first word, the second function, and the third contextual state.

6. The computing system of claim 1, wherein:

the first contextual state corresponds to a first application having been enabled on the first device, and the second contextual state corresponds to a second application having been enable on the first device.

7. The computing system of claim 6, wherein the at least one memory further comprises instructions that, when executed by the at least one processor, further cause the computing system to:

determine that the first application has been enabled on the first device; and send the first configuration data to the first device based at least in part on determining that the first application has been enabled on the first device.

8. The computing system of claim 7, wherein the at least one memory further comprises instructions that, when executed by the at least one processor, further cause the computing system to:

determine that the second application has been enabled on the first device; and send the second configuration data to the first device based at least in part on determining that the second application has been enabled on the first device.

9. The computing system of claim 6, wherein the at least one memory further comprises instructions that, when executed by the at least one processor, further cause the computing system to:

based at least in part on detecting, while the first application is enabled on the first device, the at least one first word using the first model, send, by the first device, a first call to a second device associated with the first application, the first call indicating that the at least one first word was detected and causing the second device to execute the first function; and based at least in part on detecting, while the second application is enabled on the first device, the at least one first word using the first model, send, by the first device, a second call to a third device associated with the second application, the second call indicating that the at least one first word was detected and causing the third device to execute the second function.

10. The computing system of claim 1, wherein the at least one memory further comprises instructions that, when executed by the at least one processor, further cause the computing system to:

send a representation of the first model to the first device.

11. A computer-implemented method, comprising:

determining first configuration data associating a first model with a first function and a first contextual state, the first model being usable by a first device to determine that speech detected by the first device includes at least one first word;

sending the first configuration data to the first device to configure the first device to cause the first function to be executed in response to the first model determining, while first device is in the first contextual state, that the at least one first word has been spoken;

determining second configuration data associating the first model with a second function different from the first function and a second contextual state different from the first contextual state; and sending the second configuration data to the first device to configure the first device to cause the second function to be executed in response to the first model determining, while the first device is in the second contextual state, that the at least one first word has been spoken.

12. The computer-implemented method of claim 11, further comprising:

receiving, from the first device, audio data representing first speech;

processing the audio data to determine that the first speech represents a request that a first application be executed; and based at least in part on determining that the first speech represents the request, sending, to the first device, the first configuration data.

13. The computer-implemented method of claim 11, further comprising:

configuring the first model to detect an audio signature of the at least one first word.

14. The computer-implemented method of claim 11, further comprising:

configuring the first model based at least in part on how a user of the first device speaks the at least one first word.

15. The computer-implemented method of claim 11, further comprising:

receiving, by the first device, a user input indicating the at least one first word is to be associated with a third function and a third contextual state; and storing an association between the at least one first word, the second function, and the third contextual state.

16. The computer-implemented method of claim 11, wherein:

the first contextual state corresponds to a first application having been enabled on the first device, and the second contextual state corresponds to a second application having been enable on the first device.

17. The computer-implemented method of claim 16, further comprising:

determining that the first application has been enabled on the first device; and sending the first configuration data to the first device based at least in part on determining that the first application has been enabled on the first device.

18. The computer-implemented method of claim 17, further comprising:

determining that the second application has been enabled on the first device; and sending the second configuration data to the first device based at least in part on determining that the second application has been enabled on the first device.

19. The computer-implemented method of claim 16, further comprising:

based at least in part on detecting, while the first application is enabled on the first device, the at least one first word using the first model, sending, by the first device, a first call to a second device associated with the first application, the first call indicating the at least one first word was detected and causing the second device to execute the first function; and based at least in part on detecting, while the second application is enabled on the first device, the at least one first word using the first model, sending, by the first device, a second call to a third device associated with the second application, the second call indicating that the at least one first word was detected and causing the third device to execute the second function.

20. The computer-implemented method of claim 11, further comprising:

sending a representation of the first model to the first device.

\* \* \* \* \*